United States Patent [19]

Dauber et al.

[11] Patent Number: 5,593,482
[45] Date of Patent: Jan. 14, 1997

[54] ADSORBENT ASSEMBLY FOR REMOVING GASEOUS CONTAMINANTS

[75] Inventors: Edwin G. Dauber, Chesapeake City; Christian E. Bailey, Port Deposit, both of Md.; Robert L. Sassa, Newark, Del.

[73] Assignee: W. L. Gore & Associates, Inc., Newark, Del.

[21] Appl. No.: 864,700

[22] Filed: Apr. 7, 1992

Related U.S. Application Data

[63] Continuation-in-part of Ser. No. 496,484, Mar. 20, 1990, abandoned, and a continuation-in-part of Ser. No. 666,435, Mar. 11, 1991, abandoned.

[51] Int. Cl.$^6$ ...................................................... B01D 53/04
[52] U.S. Cl. ............................... 96/135; 96/147; 96/153; 96/154; 55/274; 55/385.6; 55/514; 55/524
[58] Field of Search .............................. 55/316, 385.2, 55/385.4, 385.6, 387, 514–516, 524, 274, 275; 96/108, 134, 135, 147, 153, 154

[56] References Cited

U.S. PATENT DOCUMENTS

| | | | |
|---|---|---|---|
| 1,420,411 | 6/1922 | Currie | 55/385.4 X |
| 1,784,067 | 12/1930 | Holtson | 55/385.4 X |
| 2,671,526 | 3/1954 | Hunt et al. | 55/275 |
| 3,505,783 | 4/1970 | Graham | 55/275 X |
| 3,941,034 | 3/1976 | Helwig et al. | 55/316 X |
| 3,953,566 | 4/1976 | Gore | 264/288 |
| 4,177,048 | 12/1979 | Rivers et al. | 55/275 |
| 4,187,390 | 2/1980 | Gore | 55/528 X |
| 4,208,194 | 6/1980 | Nelson | 55/385.4 X |
| 4,274,848 | 6/1981 | LaGro | 55/387 X |
| 4,479,818 | 10/1984 | Briggs et al. | 55/385.4 |
| 4,517,308 | 5/1985 | Ehlene et al. | 55/316 X |
| 4,614,528 | 9/1986 | Lennen | 55/387 |
| 4,633,349 | 12/1986 | Beck et al. | 55/484 X |
| 4,657,570 | 4/1987 | Gronholz et al. | 55/385.6 |
| 4,668,258 | 5/1987 | Steer | 55/385.4 X |
| 4,684,510 | 8/1987 | Harkins | 55/316 X |
| 4,756,726 | 7/1988 | Peace | 55/387 X |
| 4,830,643 | 5/1989 | Sassa et al. | 55/316 |
| 4,839,014 | 6/1989 | Park et al. | 55/316 X |
| 4,863,499 | 9/1989 | Osendorf | 55/385.6 X |
| 4,889,542 | 12/1989 | Hayes | 55/385.4 X |
| 4,985,296 | 1/1991 | Mortimer, Jr. | 428/220 |

FOREIGN PATENT DOCUMENTS

| | | |
|---|---|---|
| 0225593 | 6/1987 | European Pat. Off. . |
| 2032298 | 5/1980 | United Kingdom . |

OTHER PUBLICATIONS

Sales Information on Gore–Tex® Disk Drive Breather Filters, W. L. Gore & Associates, Inc., Elkton, Maryland.
Sales Information on Gore–Sorber™ Module Application, W. L. Gore & Associates, Inc., Elkton, Maryland.
Gore–Tex™ adsorbent breather brochure—1990.

*Primary Examiner*—Robert Spitzer
*Attorney, Agent, or Firm*—Gary A. Samuels

[57] ABSTRACT

An adsorbent assembly is provided for removing gaseous contaminants from an enclosure having an adhesive layer, an adsorbent layer and a filtering layer. An exterior mounted assembly is also provided having an outer layer containing a metal or metallized material that provides an electromagnetic shield to the enclosure.

20 Claims, 8 Drawing Sheets

ADSORBENT ASSEMBLY FOR REMOVING GASEOUS CONTAMINANTS

RELATED APPLICATIONS

This application is a continuation-in-part of application Ser. No. 07/496,484 filed on Mar. 20, 1990, and application Ser. No. 07/666,435 filed on Mar. 11, 1991, both now abandoned.

FIELD OF THE INVENTION

This invention relates to a thin compact self-adhesive adsorbent assembly having a layer of adhesive, one or more layers of adsorbent or reactant material, and a layer of filter material which retains the adsorbent material, and is permeable to gases and selected liquids but impermeable to large size materials. The adsorbent assembly is designed to be internally mounted within an enclosure for removal of contaminants. Alternatively, an adsorbent assembly is also provided for mounting outside an enclosure.

BACKGROUND OF THE INVENTION

Many enclosures that contain sensitive instrumentation must maintain very clean environments in order to keep that instrumentation running properly. Examples include enclosures with sensitive optical surfaces, electronic connections and magnetic data storage surfaces on computer hard disk drives. Contaminants to these surfaces may be either particulate or gaseous in nature insomuch as they interfere with the proper operation of the equipment, and may enter the enclosure from the outside environment or be generated within the enclosure such as by outgassing of components.

Filtration devices to keep particulate from entering these enclosures are well known. They may consist of a filtration media held in place by a housing of polycarbonate, acrylonitrile butadiene styrene, or some other material; or they may consist of a filtration media in the form of a self-adhesive disk utilizing a layer or layers of pressure sensitive adhesive. These devices are mounted and sealed over a vent hole in the enclosure to filter the air entering the enclosure. Filtration performance depends not only on the filter having a high filtration efficiency but also on having a low resistance to air flow so that unfiltered air does not leak into the enclosure through a gasket or seam instead of entering through the filter.

Cartridges that contain adsorbents or reactants to remove gas or vapor impurities are also well known. They may consist of an adsorbent material held in place by a housing of polycarbonate, acrylonitrile butadiene styrene, or other material which also utilizes a filtration media that allows the exchange of gases in and out of the adsorbent cartridge while preventing the adsorbent material from becoming a source of particulate contamination. A preferred configuration of the adsorbent cartridge is to have the adsorbent completely encapsulated by the filtration media such as in a tube of pure expanded polytetrafluoroethylene as described in U.S. Pat. No. 4,830,643.

Another constraint, however, in many enclosures is space. The sensitive instrumentation is continually being miniaturized and put in smaller and smaller enclosures. In some cases this compounds the contamination problem as surfaces become more sensitive and closer together such as in computer hard disk drives where particulates, hydrocarbon gases, acid gases, and solvent vapors become more of a problem as read/write head flying heights become smaller and more sensitive higher density thin film recording media are employed.

Breather filters that are constructed of only filter media and a self-stick adhesive are ideal for these applications as they can be made very thin and small in size. Adsorbent cartridges or tubes, however, take up valuable space in these enclosures, and when they are used, they often must be put into a corner away from the most sensitive surfaces because of space constraints.

One solution of these problems is the combination of an adsorber breather filter. These can be made by filling a cartridge of polycarbonate, acrylonitrile butadiene styrene, or some other material with adsorbent and securing filter media on both ends of the cartridge and attaching said cartridge to the enclosure which needs a controlled environment. This allows air to enter the enclosure through the adsorbent to clean the air that enters the enclosure. Gas or vapor contaminants that outgas or originate from sources inside the enclosure can be captured by the adsorbent by diffusing through the filter media into the adsorbent material. These cartridges also take up space although they can be mounted outside the enclosure. Outside mounting, however, raises problems of rigidity and sturdiness as a filter that protrudes from the enclosure is subject to easier damage.

A second contamination adsorbent breather filter is also available that encapsulates the adsorbent material between two layers of filter media and is applied to the enclosure with a layer of self-stick adhesive.

Both of these above-mentioned adsorbent breather configurations, however, have two major drawbacks. First, since they utilize two layers of filter media and a layer of adsorbent material, they suffer from a fairly high resistance to air flow. As mentioned earlier, filtration performance in a breather filter depends in part upon the filter having a low resistance to air flow such that unfiltered air is not forced or allowed to leak through gaskets or seams that might open up under higher pressure. Secondly, since they are located directly under or over a vent hole into the enclosure, one side of the adsorbent breather faces the outside atmosphere and the adsorbent can become more quickly spent or saturated with gaseous contaminants.

Moreover, since these breather assemblies are mounted over holes in the enclosure, they fail to provide adequate shielding to electromagnetic interference. Further, no indicator is present on these assemblies to let the user know when the filter adsorbent has been spent.

There is a need for a system that minimizes space requirements for adsorbent, and has a long lasting adsorbent that is easily mounted proximate to the critical areas of enclosures housing sensitive instrumentation.

SUMMARY OF THE INVENTION

This invention provides a self-stick adsorbent assembly having a low profile container for selectively adsorbing gaseous components comprising one or more layers of adhesive, one or more layers of adsorbent or reactant material and a layer of filtering material.

The assembly provides a means for continually depleting the air of unwanted contaminating gases in an enclosure by providing a means for adsorbing these unwanted gases without limiting the performance of other particulate filtration devices and by placing the device proximate to the critical areas that require protection and as far away as possible from the outside atmosphere.

A further embodiment comprises an adhesive layer, an adsorbent layer, a filtering layer, and a nonpermeable shielding layer. This assembly provides a means for removing unwanted gaseous contaminants from inside an enclosure and is designed for an exterior mounting thereby also providing a shield from electromagnetic interference from outside the enclosure. The exterior mounted assembly may also be provided with an indicator means to let the user know when the adsorbent has been spent and when a new assembly is required.

BRIEF DESCRIPTION OF THE DRAWINGS

FIG. 7a is a cross-sectional view of FIG. 7 along line 7a—7a.

FIG. 8a is a cross-sectional view of FIG. 8 along line 8a—8a.

DETAILED DESCRIPTION OF THE PREFERRED EMBODIMENTS

The present invention provides a very thin adsorbent filter assembly that is self-adhering for use within the interior enclosure of a computer disk drive that is capable of removing contaminants within the enclosure. Because of the novel features of the assembly, specifically its thin dimensions, contaminants are easily removed without any interference of the operation of the disk drive.

A new construction provides for an adsorbent assembly designed to be mounted on the exterior of an enclosure over an access hole or vent such as the holes in computer disk drives that exist for equipment that provides for transfer of data or coding instructions onto disk media after assembly of a drive (i.e. a servo write).

Figure 1:
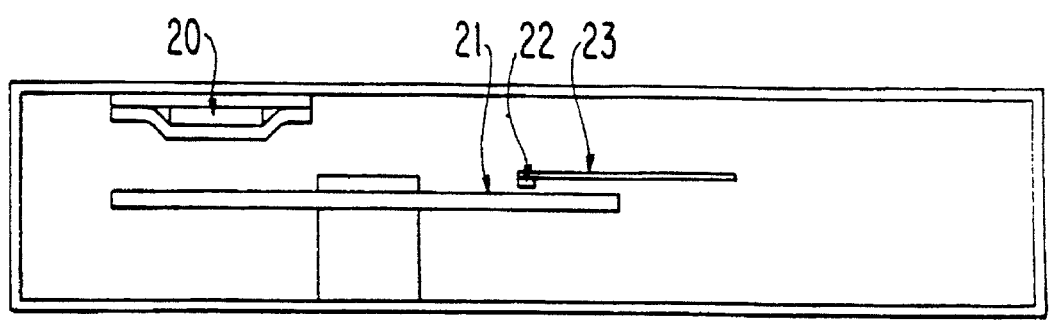
FIG. 1 is a simplified schematic drawing of the interior of a disk drive enclosure showing the adsorbent assembly.

Referring to FIG. 1, a first embodiment is shown where the thin adsorbent assembly 20 is located at a site of concentrated contaminants where it is capable of removing contaminants. FIG. 1 also shows the magnetic storage disk 21, read/write head 22, and armature 23 to control position of read/write head. Gaseous contaminants that may be of concern include but are not limited to dioctylpthalate, chlorine, hydrogen sulfide, nitrous oxide, mineral acid gases, and vapors from silicone, hydrocarbon based cutting oils, and other hydrocarbon pollutants. In general, the filter assembly will have at least one layer of adhesive, at least one layer of adsorbent material and one layer of filter material.

The adhesive layer may be either a single layer of transferable adhesive or a double-sided adhesive coated onto a carrier such as polyester or polypropylene. A preferred adhesive utilizes a high peel strength of greater than 30 ounces/inch as measured by PSTC #1 (FTM1), low outgassing of less than 0.1% collected volatile condensible material (cvcm) as measured by ASTM E-595-84 and E-595-77, solvent-free non-particulating permanent acrylic pressure sensitive adhesive. A commercially available adhesive satisfying these requirements is Bostik® P/N 11-610-5. Other adhesives are also suitable such as high temperature permanent acrylic pressure sensitive adhesives, FDA approved adhesives, and removable adhesives.

The adsorbent may comprise one or more layers of 100% adsorbent material such as granular activated carbon or may be a filled product such as a scaffold of porous polymeric material in which void spaces are filled with an adsorbent. Other possibilities include adsorbent impregnated non-woven such as cellulose or polymeric non-wovens that may include latex or other binders as well as porous castings of adsorbents and filters that are polymeric or ceramic. The adsorbent may be 100% of a particular adsorbent or may be a mixture of different types of adsorbents, the selection of which is dependent on the specific application. A preferred embodiment is the use of expanded porous polytetrafluoroethylene (PTFE) made in accordance with the teachings in U.S. Pat. Nos. 3,953,566 and 4,187,390, the expanded porous PTFE then filled with a particular adsorbent material. The filled PTFE is particularly desirable because the adsorbent material does not migrate to the outside and cause contamination problems. A layer of filled PTFE is also desirable because it can be made in extremely thin dimensions such as having a thickness of less than about 0.005 inches thus being adaptable to fit in extremely low profile applications.

The adsorbent material may include physisorbents, such as silica gel, activated carbon, activated alumina, or molecular sieve, or chemisorbents, such as potassium permanganate, calcium carbonate, calcium sulfate, powdered metals or other reactants for scavenging gas phase contaminants depending on the known contaminants desired to be removed. In addition, the adsorbent material may be a mixture of the above-mentioned materials. Further, multiple layers of adsorbent materials may be used such that each layer contains a different adsorbent and contaminants may be selectively removed as they pass through the different layers.

The outer filter layer may comprise any gas permeable, particulate filtration media that allows vapor contaminants to diffuse through it to the adsorbent layer. The outer filter layer also provides a means of containing the adsorbent material (or layer) within the assembly. The filter layer may include polymeric membranes, non-shedding filter paper or laminated filtering materials. A preferred material having a high vapor transmission and high particulate retention is a membrane of expanded porous PTFE, or a laminate thereof.

The most preferred filtering layer is expanded porous PTFE having an air permeability of 7.0 cubic feet/minute/ square foot of membrane at a 0.5 inch of water column differential pressure with a particulate filtration efficiency greater than 99.97% retention of particles greater than or equal to 0.3 micrometers in diameter.

Figure 2:
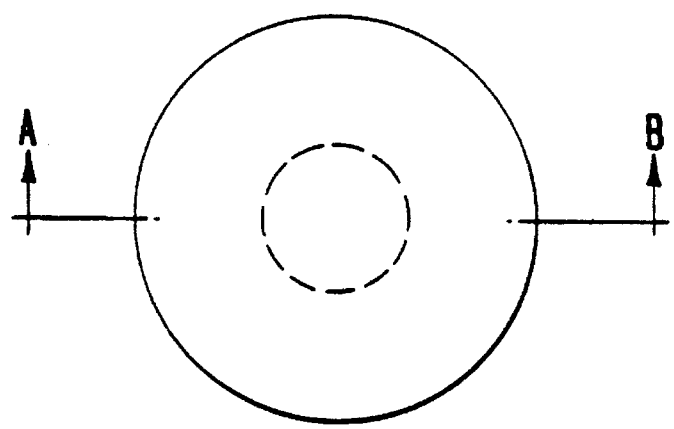
FIG. 2 is a top view of the adsorbent assembly.
Figure 2A:
FIG. 2a is a cross-sectional view of the assembly taken along line A–B.

The first embodiment is best understood by reference to drawings 2–6. FIG. 2 provides an enlarged top view of the filter assembly. In this embodiment, at best seen in cross-section shown in FIG. 2a, the filter assembly comprises one layer of an adhesive 10 for attachment of the assembly to an interior surface in the enclosure, an adsorbent material layer 11 and a top filtering layer 12 such that the adsorbent layer 11 is totally encapsulated between the adhesive layer 10 and the filter layer 12.

Figure 3:
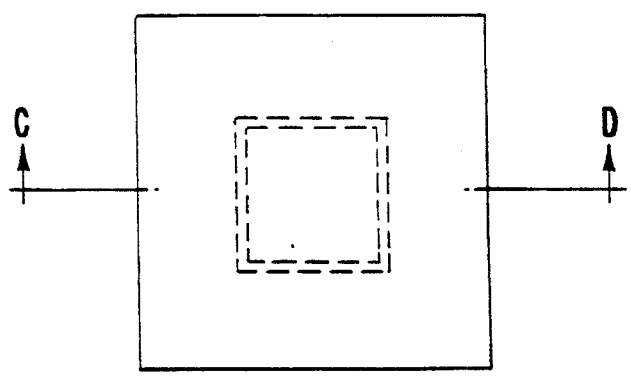
FIG. 3 is a top view of a second embodiment.
Figure 3A:
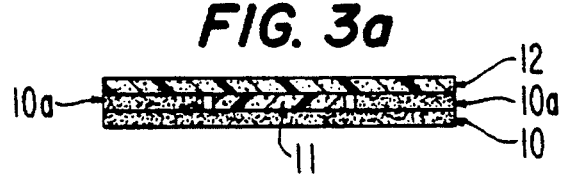
FIG. 3a is a cross-sectional view of this embodiment taken along line C–D.

FIGS. 3 and 3a show a second embodiment of the assembly wherein two adhesive layers 10 and 10a in laminar relationship are provided in this embodiment, the second tier of the assembly comprises exterior areas of an adhesive layer 10a and centered between them is disposed the adsorbent layer 11.

Figure 4:
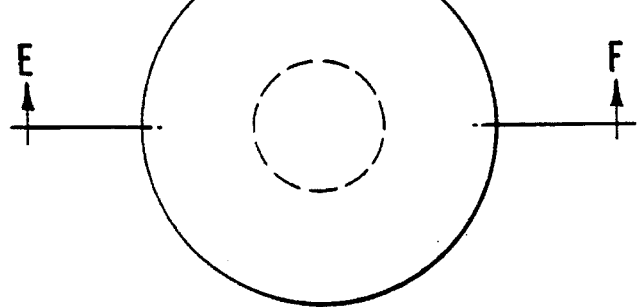
FIG. 4 is a top view of a third embodiment of the present invention.
Figure 4A:
FIG. 4a is a cross-sectional view of this embodiment taken along line E–F.

FIGS. 4 and 4a show a third embodiment wherein two adsorbent layers 11 and 11a are employed superimposed on each other (in series) which are further sandwiched between an adhesive layer 10 and an outer filter layer 12.

Figure 5:
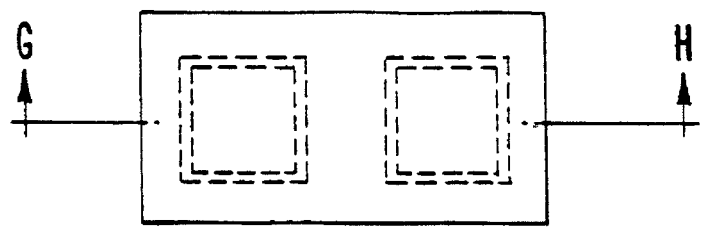
FIG. 5 is a top view of a fourth embodiment of the present invention.
Figure 5A:
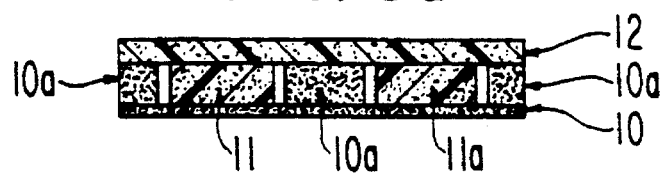
FIG. 5a is a cross-sectional view of this embodiment taken along line G–H.

FIGS. 5 and 5a show an embodiment of the filter assembly wherein the adsorbent layers 11 and 11a are located in the middle layer in a side-by-side configuration (in parallel) each adsorbent layer surrounded by an adhesive layer 10a. A central adhesive layer further separates the two adsorbent layers. Each adsorbent layer can be of a different size.

Figure 6:
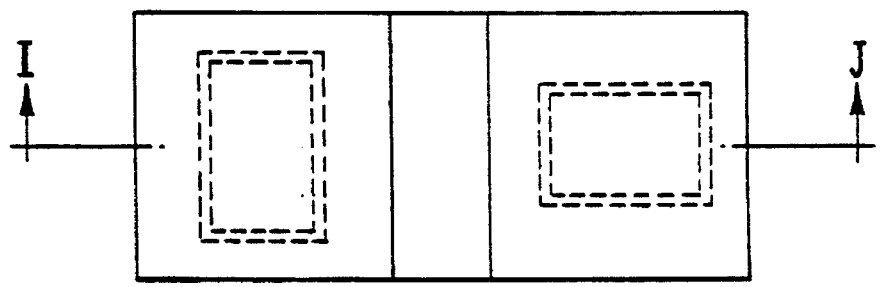
FIG. 6 is a top view of a fifth embodiment of the present invention.
Figure 6A:
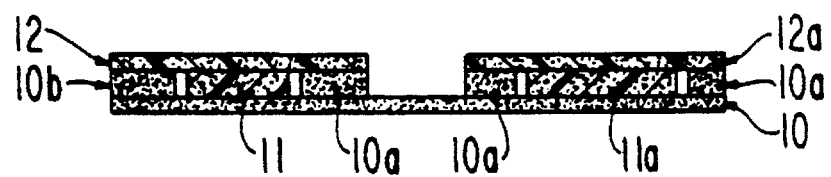
FIG. 6a is a cross-sectional view of FIG. 6 along line I–J.

FIGS. 6 and 6a show a fifth embodiment that is similar to the side-by-side configuration shown in FIG. 5; however, this embodiment provides for a space between two regions comprising adhesive layers surrounding an adsorbent layer.

Figure 7:
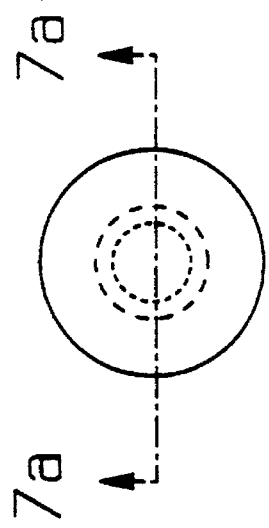
FIG. 7 is a top view of a sixth embodiment and is of an outside mount version of the present invention.
Figure 8:
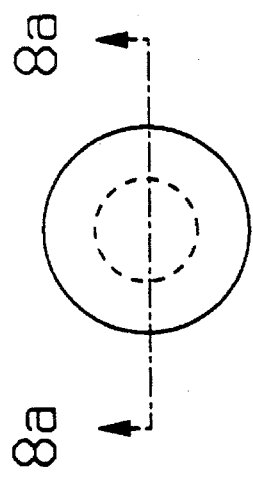
FIG. 8 is a top view of a seventh embodiment, and again is of an outside mount version of the present invention.
Figure 9:
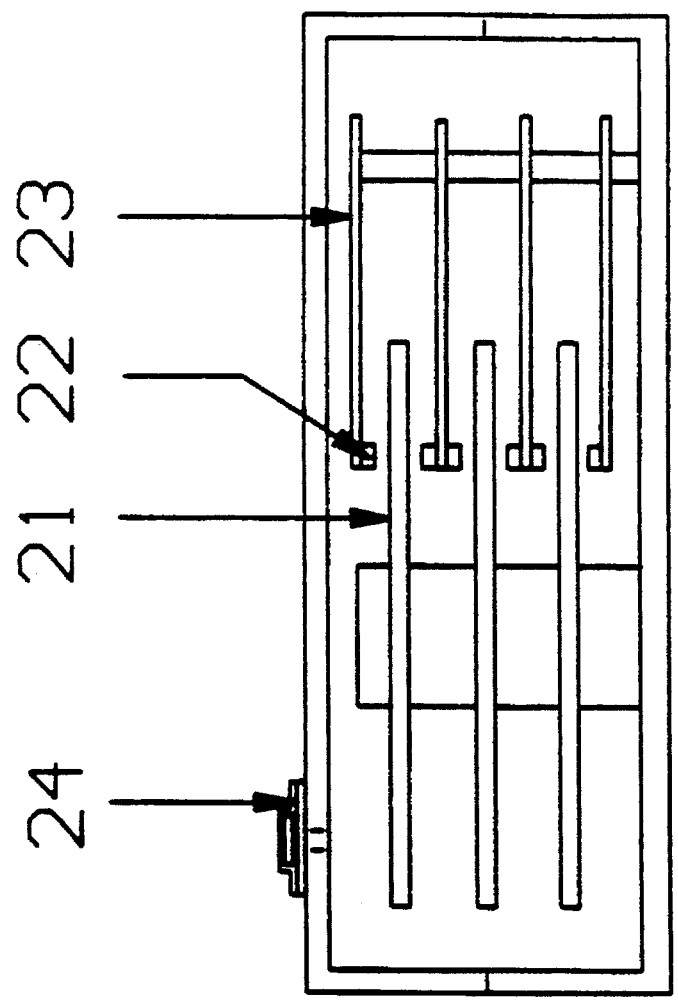
FIG. 9 is a simplified schematic drawing of the cross-section of a drive enclosure showing the use of one of the outside mount embodiments of the adsorbent assembly.
Figure 10:
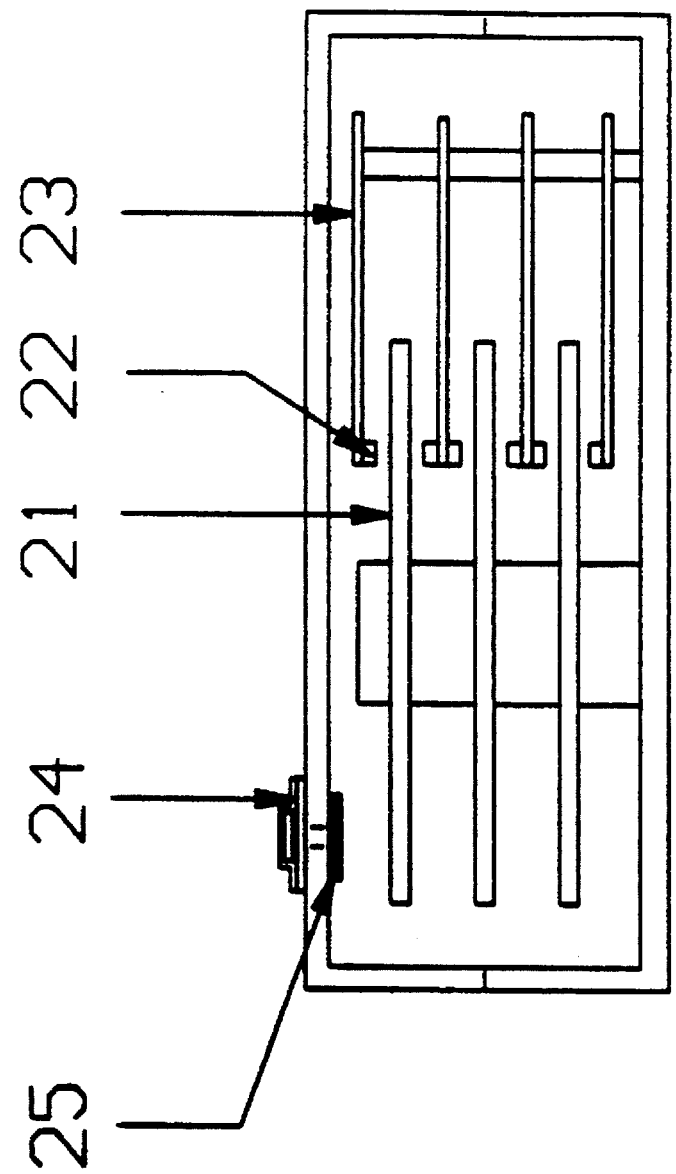
FIG. 10 is a simplified schematic drawing of the cross-section of a drive enclosure provided with standard breather filter on the inside of the enclosure and an exterior adsorbent assembly.
Figure 11:
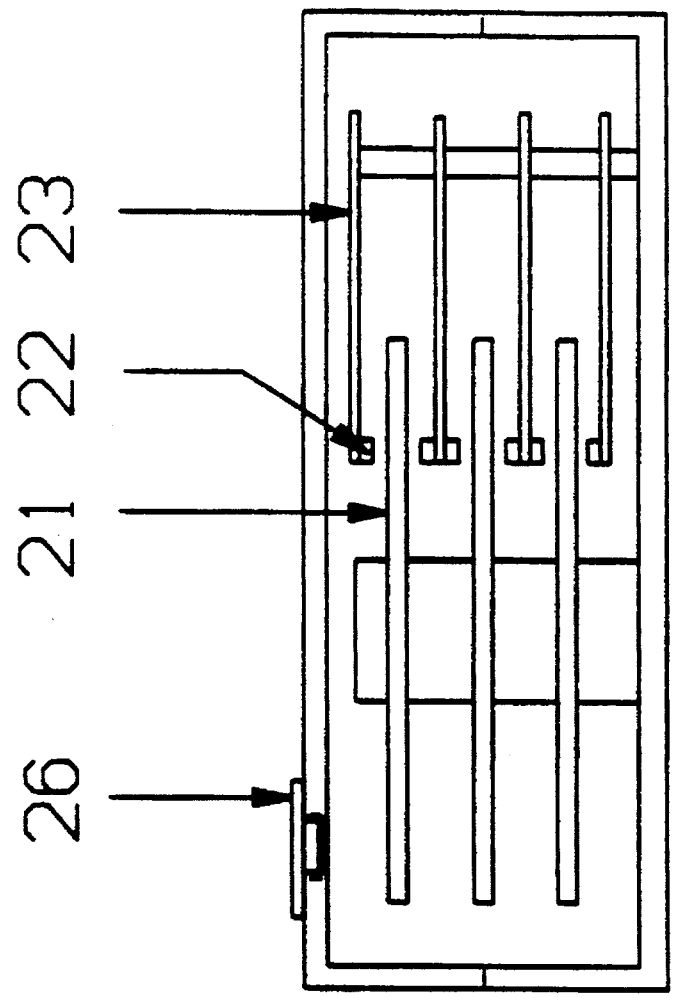
FIG. 11 is a simplified schematic drawing of the interior of a drive enclosure showing the use of an outside mount embodiment which inserts the adsorbent layer into a hole in the enclosure and leaves a relatively flat outside profile.

FIGS. 7 and 8 show views of the assembly intended for mounting on the exterior of the enclosure. FIGS. 9–11 show schematic drawings of the exterior mounted assemblies.

Figure 7A:
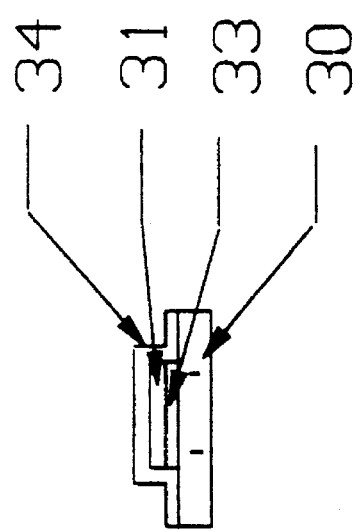

FIG. 7 provides an enlarged top view of the exterior mount assembly. In this embodiment, as shown in FIG. 7a, an adhesive layer 30 in the shape of an annular ring is located on the exterior of the enclosure over a vent to the enclosure. An adsorbent layer 31 laminated to a filter layer 33 is located adjacent to and in laminar relation to the adhesive layer 30 so that the filter layer 32 is sandwiched between central portion of the annular ring of the adhesive layer 30 and the adsorbent layer 31. An outer impermeable layer 34 is applied over the adsorbent layer 31 which isolates the adsorbent layer 31 from the outside environment.

Figure 8A:
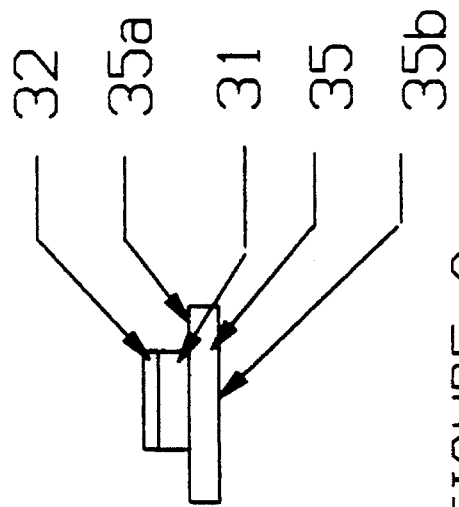

A further exterior mounting embodiment, as shown in FIGS. 8 and 8a, includes an adhesive layer 35 which has an adhesive on the inside surface 35a and is impermeable, nonabrasive and preferably metallized on the outside surface 35b. Adjacent the adhesive side of layer 35 and in laminar relation thereto is adsorbent layer 31. Adjacent adsorbent layer 31 and in laminar relation thereto is trapped by the filtering layer 32, which protects and prevents contamination of the adsorbent layer from entering the enclosure. In this embodiment, the filter and adsorbent layers are intended to be contained within the access hole of the enclosure in a manner such that the adhesive layer mounts to the enclosure via the adhesive surface and the metallized surface remains flush with the enclosure wall. The application of such an an adsorbent assembly 26 is shown in FIG. 11. This provides an assembly with a relatively flat enclosure profile thereby reducing the risk of damage to the adsorbent assembly.

For either of the embodiments (FIGS. 7a or 8a) mounted on the outside of the enclosure, the filter, adsorbent and adhesive layers are made from the same materials as described above. The outer impermeable layer 34 or 35 is made preferably from a transparent film such as polyester, polypropylene, or FEP so as the adsorbent can be visible. An adsorbent may also be provided with an indicator that changes color when the adsorbent has been spent. This provides the user an opportunity to change the adsorbent assembly and maintain an efficient collection system. Common indicators include cobalt chloride for moisture detection, O-tolidine for chlorine detection, $N,N^1$-diphenylbenzidene for detection of nitrous oxides and disodium tetrachloromercurate and methyl red for detection of sulfous oxides.

Alternatively and more preferably, the outer impermeable layer 34 or 35 is a metal metallized material such as aluminized polyester sheeting such as metallized Mylar®, a polyester commercially available from E. I. DuPont de Nemours & Co., Inc. that has been coated with a metallized layer. This metallized exterior layer provides a shield to any electromagnetic interference as well as a barrier to permeation of additional gases.

In addition, a conductive adhesive such as Series #3142 commercially available from Richards, Parents, and Murray, Inc. may be used as the adhesive layer 30 in combination with the metallized exterior layer 34 or 35 thus completing an electrically conductive assembly that prevents buildup of static electrical charges.

An outer mounted adsorbent assembly may be employed in conjunction with a breather filter vent 25 designed for mounting within an enclosure, as shown schematically in FIG. 10. This construction allows for replacement of the outside mounted assembly without disruption of the operation of the disk drive or need to open the enclosure. The outer adsorbent assembly may also be used as an indicator wherein the adsorbent is an activated carbon or chemically treated adsorbent treated for the adsorption of acidic gases such that the color of the adsorbent changes when the adsorbent has been saturated.

EXAMPLE 1

A self-adhesive adsorbent filter assembly was made having the following features. The assembly was disk shaped and has a 1.0 inch (25.4 mm) outside diameter and a thickness of 0.035 inches (0.889 mm). A top retention layer was provided comprising expanded porous PTFE membrane that had a thickness of less than 0.001 inches (0.0254 mm) and laminated to a non-woven polyester backing having a thickness of 0.0055 inches (2.1397 mm). The laminate was at least 99.97% efficient at filtering particulate having a diameter equal to or greater than 0.3 micrometer. The laminate also had a maximum resistance to air flow of 1.38 inches (35.05 mm) of water at an air velocity of 10.5 fpm (3.2 mm/min).

The adsorbent layer was approximately 0.5 inches in diameter and had a thickness of 0.022 inches (0.5589 mm). The adsorbent layer was constructed of expanded PTFE filled with activated carbon with a 60% by weight carbon loading and a total carbon content of 0.0257 grams of activated carbon.

The adhesive layer actually comprised two sides of 0.001 inch (0.0254 mm) thick each high temperature permanent acrylic pressure sensitive adhesive on both sides of a polyester film carrier having a thickness of 0.002 inches (0.0508 mm).

The adsorbent filters were placed on a release liner for easy handling. The adsorbent filter was placed inside a computer disk drive. The assembly was capable of adsorbing over 25 milligrams of carbon tetrachloride. When this assembly is placed inside the enclosure housing sensitive equipment such as a computer hard disk drive, it is capable of offering long term protection by preventing gaseous contaminants from reaching the magnetic storage disks and extending the useful life of the drive.

EXAMPLE 2

A self-adhesive adsorbent assembly similar to FIGS. 7 and 7a was made having the following features. The assembly was disk shaped and had a 1.0 inch (25.4 mm) outside diameter and a thickness of 0.035 inches (0.889 mm). The top layer 24 was made of a 0.0005 inch (0.0127 mm) thick metallized mylar film that easily conformed around and over the adsorbent layer, and provided an EMI shield over the access hole. The filter material was a layer of expanded porous PTFE membrane that had a thickness of about 0.004 inches (0.1016 mm), a permeability of 7.0 Gurley seconds (defined as the time it took 100 cc of air to pass through 1 square inch (645.16 mm$^2$) of media with a pressure differential of 4.88 inches (123.952 mm) of water column), and a water vapor transmission rate of 70,000 grams of H$_2$O per square meter of media per 24 hour period. The filter layer was laminated to the adsorbent layer.

The adsorbent layer was constructed of an activated carbon filled expanded PTFE membrane with a 70% by weight carbon loading and a total carbon content of 0.0468 grams of activated carbon. This particular activated carbon is able to absorb 60% of its own weight in carbon tetrachloride. The adsorbent layer was approximately 0.5 inches (12.7 mm) in diameter and had a thickness of 0.026 inches (0.673 mm).

The adhesive layer comprised two sides of 0.001 inch (0.0254 mm) thick—each high temperature permanent arylic pressure sensitive adhesive on both sides of a polyester film substrate having a thickness of 0.002 inches (0.0508 mm) to adhere to the outside of the enclosure as well as to hold the adsorbent and metallized mylar layers.

The permeability in Gurley Seconds was measured with a W. & L. E. Gurley Densometer Model #4110 manufactured by Teledyne. Moisture Vapor Transmission Rates were measured in accordance with ASTM (American Society of Test Materials) E-96-80 standards.

This assembly was mounted onto the exterior wall of an enclosure similar to that shown in FIG. 9. Here the assembly was located at a key area where potential contaminants were adsorbed before they could react with-sensitive recording media. In this embodiment, the adsorbent layer was completely outside the enclosure and was centered over the access hole wherein the mounting adhesive circumscribed the hole of the enclosure.

This assembly is capable of adsorbing 28 milligrams of carbon tetrachloride before reaching saturation.

EXAMPLE 3

A self-adhesive adsorbent assembly similar to FIGS. 8 and 8a was made having the following features. The assembly was rectangular shaped having a length of 0.75 inches (19.05 mm) and a width of 0.375 inches (9.525 mm) and a thickness of 0.050 inches (1.27 mm). The top layer was a filter material comprising a layer of expanded PTFE membrane that had a thickness of about 0.004 inches (0.1016 mm), a permeability of 7.0 Gurley seconds, and a water vapor transmission rate of 70,000 grams of H$_2$O per square meter per 24 hour period. The filter layer was laminated to the adsorbent layer.

The adsorbent layer was approximately 0.043 inches (1.0922 mm) thick and 0.625 inches (15.875 mm) long and 0.156 inches (3.9624 mm) wide. The adsorbent layer was constructed of a silica gel with blue indicator gel impregnated into an expanded porous PTFE membrane with a 40% by weight silica gel plus indicator loading and a total silica gel content of 0.021 grams of silica gel at 20% relative humidity.

The adhesive layer was a layer of 0.001 inch (0.0254 mm) thick high temperature removable acrylic pressure sensitive adhesive on a clear polyester film substrate having a thickness of 0.002 inches (0.0508 mm). The layer was adhered to the outside of the enclosure as well as to the adsorbent layer. The clear polyester film gave visual access to the blue indicator gel which turned pink when the silica gel was saturated with moisture. The removable adhesive allowed for easy replacement of the adsorbent when needed.

It will be apparent to those skilled in the art that various modifications and variations can be made without departing from the scope of this invention.

We claim:

1. An adsorbent assembly having a low profile container for removing unfiltered gaseous contaminants generated within an enclosure consisting of three layers including a layer of an adhesive; a flattened adsorbent layer; and a layer of filtering media of expanded porous polytetrafluoroethylene membrane wherein the adsorbent layer is placed between the adhesive layer and the filtering layer.

2. An adsorbent assembly of claim 1 wherein the adhesive layer is a double-sided adhesive of non-particulating permanent acrylic coated onto a carrier.

3. An adsorbent assembly of claim 1 wherein the adsorbent layer comprises 100% adsorbent material.

4. An adsorbent assembly of claim 1 wherein the adsorbent layer comprises a scaffold of porous polymeric material impregnated with an adsorbent.

5. An adsorbent assembly of claim 4 wherein the scaffold of porous polymeric material is expanded porous polytetrafluoroethylene.

6. An adsorbent assembly of claim 1 wherein the thickness of the adsorbent layer is less than about 0.005 inches.

7. An adsorbent assembly of claim 1 wherein the adsorbent material is selected from the group consisting of physisorbents such as silica gel, activated carbon, activated alumina and a molecular sieve.

8. An adsorbent assembly of claim 1 wherein the adsorbent material is selected from the group consisting of potassium permanganate, calcium carbonate, calcium sulfate and powdered metals.

9. An adsorbent assembly of claim 1 wherein the layer of filtering media is a laminate of expanded porous polytetrafluoroethylene and support material.

10. An adsorbent assembly as described in claim 1 for use in removing gaseous contaminants from within a computer disk drive enclosure wherein the filtering layer is a top layer of expanded porous PTFE having an air permeability of equal to or less than 7.0 cubic feet/minute/square feet of membrane at a 0.5 inches of water column differential pressure and a filter efficiency of greater than 99.97% retention of particles greater than or equal to 0.3 micrometers, that is laminated to a non-woven backing, a middle adsorbent layer comprising expanded PTFE filled with an activated adsorbent and a bottom adhesive layer of a polyester film carrier laminated on two sides with a high temperature permanent acrylic pressure sensitive adhesive wherein the top filtering layer and bottom adhesive layer surround the middle adsorbent layer and further wherein the top filtering layer and bottom adhesive layer meet to form a seam along a peripheral edge of the adhesive layer and wherein the entire assembly is disk shaped and has a thickness of about 0.035 inches.

11. An adsorbent assembly as described in claim 1 wherein the layer of adhesive is transparent and said adsorbent layer contains an indicator that changes color when the adsorbent has been spent, said adsorbent assembly capable of being mounted on the outside of an enclosure into an access hole of the enclosure so that the adsorbent layer is visible from the outside.

12. An adsorbent assembly of claim 11 wherein the adhesive layer has a substrate selected from the group consisting of polyester, polypropylene and FEP and the indicator is selected from the group consisting of cobalt chloride, O-tolidine, N,N$^1$-diphenybenzidine, disodium tetrachloromercurate, and methyl red.

13. An adsorbent assembly having a low profile container for removing unfiltered gaseous contaminants generated within an enclosure consisting of three layers including a layer of an adhesive; a flattened adsorbent layer; and a layer of filtering media of expanded porous polytetrafluoroethylene membrane wherein the adsorbent layer is placed between the adhesive layer and the filtering layer and wherein the adhesive layer is comprised of two surfaces, the first surface being of the adhesive for use in mounting the assembly outside of the enclosure and a second outer surface comprising a metallized surface that provides an electromagnetic insulating shield to the enclosure.

14. An adsorbent assembly of claim 13 wherein the metallized material is aluminized polyester sheeting.

15. An adsorbent assembly of claim 13 wherein the adhesive layer is a conductive adhesive to prevent buildup of static electrical charges.

16. An adsorbent assembly having a low profile container for removing unfiltered gaseous contaminants generated within an enclosure consisting of an adhesive layer in the form of an annular ring having a central void space, a layer of filtering media of expanded porous polytetrafluoroethylene membrane within the void space, a layer of an adsorbent material in laminar relation to the annular adhesive ring and filter media and an outer impermeable layer in laminar relation to the adsorbent layer.

17. An adsorbent assembly of claim 16 wherein the outer impermeable layer is a metallized material that provides an electromagnetic insulating shield to the enclosure.

18. An adsorbent assembly of claim 17 wherein the metallized material is aluminized polyester sheeting.

19. An adsorbent assembly of claim 16 wherein the adsorbent layer contains an indicator capable of changing color when the adsorbent has been spent and wherein the outer impermeable layer is transparent thereby rendering the indicator visible.

20. An adsorbent assembly of claim 19 wherein the impermeable layer is selected from the group consisting of polyester, polypropylene, and FEP and the indicator is selected from the group consisting of cobalt chloride, O-tolidine, N,N$^1$-diphenylbenzidine, disodium tetrachloromercurate, and methyl red.

* * * * *